E. B. SELLARD.
GANG AND MOTOR PLOW.
APPLICATION FILED OCT. 4, 1910.
1,030,687.
Patented June 25, 1912.
3 SHEETS—SHEET 2.
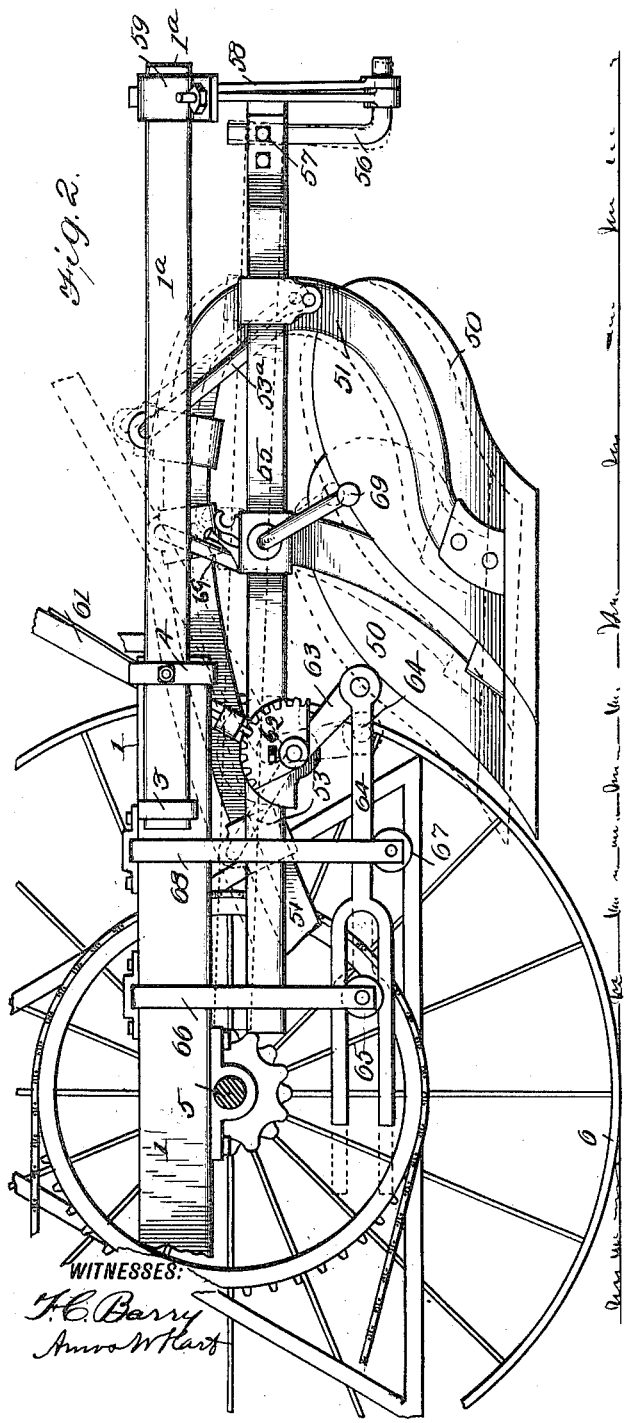
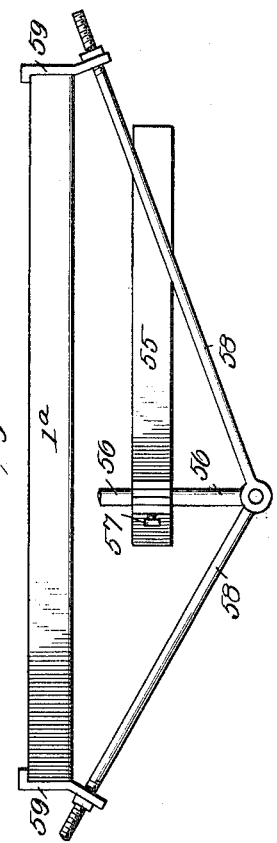
INVENTOR
EDMOND B. SELLARD
BY
ATTORNEYS

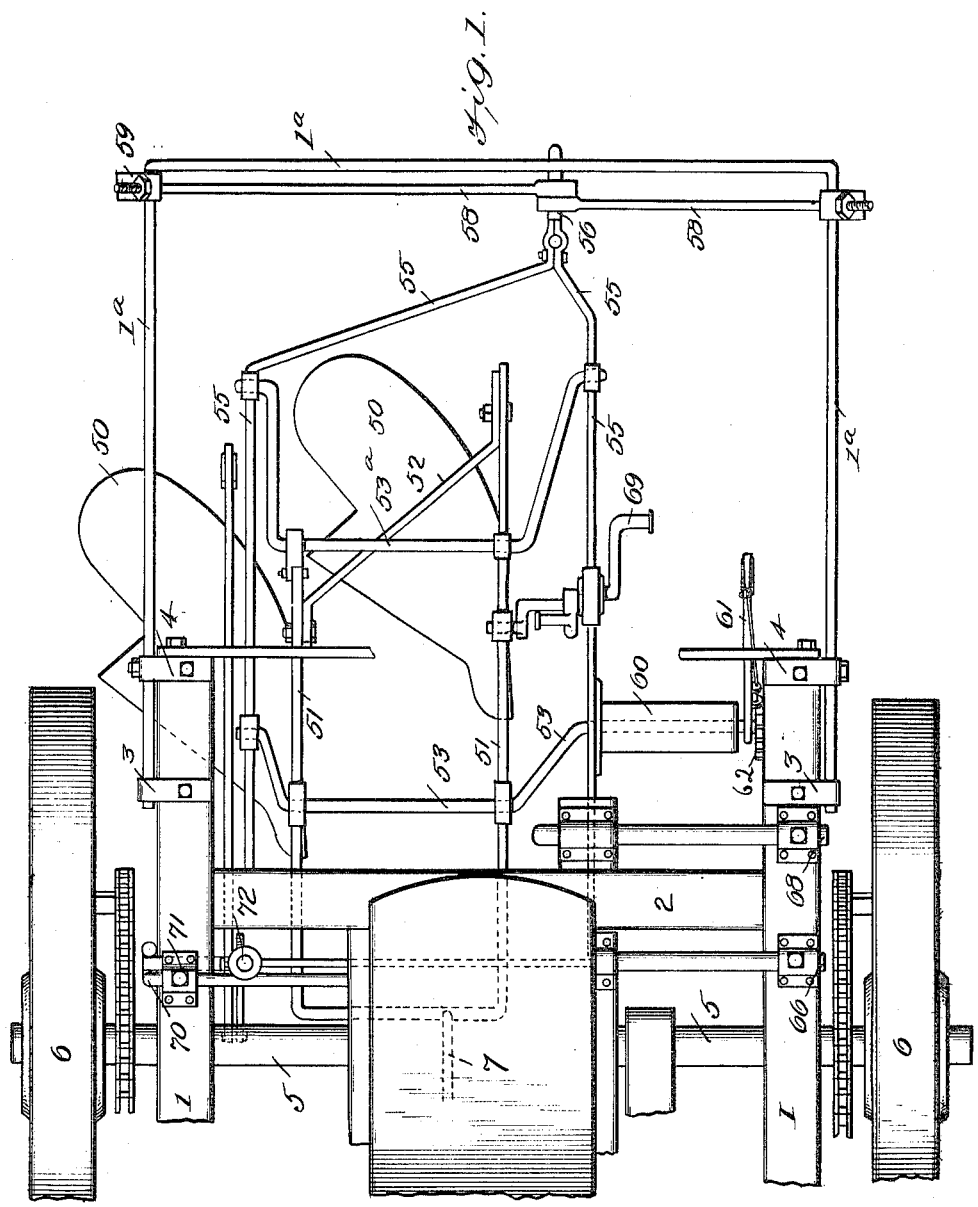

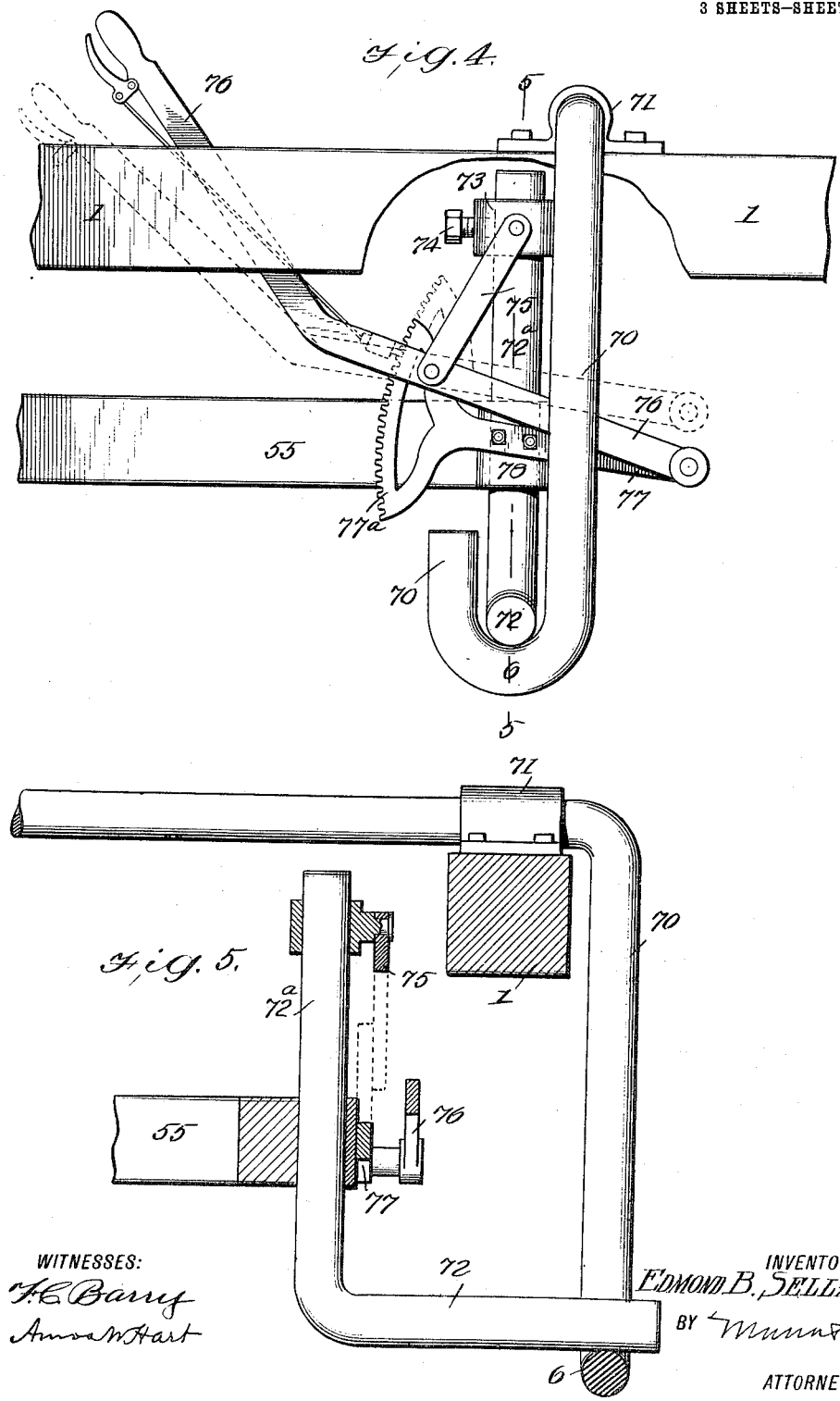

UNITED STATES PATENT OFFICE.

EDMOND B. SELLARD, OF MEXICO, MISSOURI.

GANG AND MOTOR PLOW.

1,030,687.  Specification of Letters Patent.  Patented June 25, 1912.

Original application filed June 9, 1910, Serial No. 565,925. Divided and this application filed October 4, 1910. Serial No. 585,181.

*To all whom it may concern:*

Be it known that I, EDMOND B. SELLARD, a citizen of the United States, and a resident of Mexico, in the county of Audrain and State of Missouri, have invented an Improvement in Gang and Motor Plows, of which the following is a specification.

This application is a division of an application filed in the Patent Office by me June 9, 1910, Serial No. 565,925.

The object of this invention is to effect an improvement in means for attaching, suspending, and adjusting plows with reference to a frame supported upon wheels and which is preferably driven by a motor.

The details of construction, arrangement, combination, and operation of parts are as hereinafter described and illustrated in the accompanying drawings, in which—

Figure 1 is a plan view of my invention, together with certain parts which are included in the original invention and which will be found fully described in the aforesaid application. Fig. 2 is a side view, the plows being shown elevated. Fig. 3 is a rear view of the machine. Fig. 4 is a side view of the means for adjusting the front end of the plow frame higher or lower. Fig. 5 is a vertical cross section on the line 5—5 of Fig. 4.

Referring particularly to Figs. 1 and 2, the numeral 1 indicates the side bars of the main frame, connected by a cross-bar 2 and mounted upon the axle 5 having transporting wheels 6 and carrying a motor. The motor is arranged for driving the machine in a manner which may be understood by reference to my before-mentioned original application. To the main frame 1, 2, is attached a supplemental rear frame 1ª, the forward ends of the same being secured to side bars 1 by means of keepers 3 and screw-clamps 4.

The plows 50 are arranged in gang and provided with curved beams 51 whose front ends are rigidly connected and between whose rear ends a similar connection is formed by means of a diagonal bar 52, as shown in Fig. 1. The beams are attached to front and rear curved bails indicated, respectively, by numerals 53 and 53ª, and said bails are journaled on a frame 55, which as shown in Fig. 1, is substantially rectangular, the rear end, however, being formed at an angle and attached adjustably to the vertical arm 56 of what is usually the axle of a certain class of gang plows. A clamp screw 57 serves to secure the parts together in any required vertical adjustment. The arm 56 is supported by a hanger consisting of two rods 58 whose outer threaded ends pass through brackets 59 secured at the angles of the detachable supplemental frame 1ª, and are provided with nuts whereby they may be adjusted as required. The rods 58 are inclined downward at an obtuse angle, as shown in Fig. 3. The left end of the front bail 53 is extended laterally and supported in a tubular guide 60, that is rigidly attached to the plow frame 55. A toothed segment 62 is fast on the left-hand end of bail 53, and a hand lever 61 is fulcrumed on such bail and provided with a pawl adapted to lock with such segment.

A rigid arm 63—see Fig. 2—extends from the lever downward and is jointed to the rear end of a form 64 that embraces and rides on a roller 65 which is journaled in a hanger 66 that depends from a main frame 1. The shank of the fork rides on another anti-friction roller 67 which is journaled in the lower end of another hanger 68.

For raising plows out of the ground or supporting them above the ground a foot lever 69 is employed, the same being in the nature of a crank as shown in Fig. 2 which crank is journaled in a keeper on the plow frame 55 and whose inner end is journaled in a cuff or keeper on the adjacent side of a plow beam 51. By pressing downward on the crank 69, the plow bodies may be raised as required.

The rack or segment 62 is fast on bail 53, and lever 61 is integral with arm 63 which is pivoted to the rear end of the slidable fork 64. The foot-lever 69 serves as a means for letting the plow shares or bodies into the ground. When this has been done, the plows will hold their position, in which case one side is higher than the other. The plows are leveled by operating lever 61 in connection with segment 62, arm 63 and fork 64. To raise the plows, the foot-lever 69 is alone employed. A latch is in practice provided for holding the foot-lever 69 in position to support the plows in raised position.

In raising plows by foot-lever 69, the frame and plow bodies are thrown out of level, but, since they are not then operative, being clear of the ground, this does not matter, for upon being let back into the ground by foot-lever 69, they again assume a level position and re-leveling by means of lever 61 is unnecessary except to plow at different depths. In fact, the re-leveling of the frame while plows are clear of the ground and inoperative is entirely optional with the operator.

On the opposite side of the machine there is another hanger 70—see Figs. 4 and 5— which is journaled in a keeper 71 on the main frame 1 and is thus adapted to swing forward and back. The plow frame 55 is connected with this hanger and also made vertically adjustable by the following means. I dispense with a furrow wheel at this point which is employed in a certain class of gang plows and I support the axle 72 in the curved lower end of the hanger 70, as shown. On the vertical stem or arm 72ª of the axle, I secure a box or keeper 73, by means of a clamp-screw 74 and to this I pivot a link 75 which in turn is pivoted to a hand lever 76 whose front end is fulcrumed on a rigid arm 77 that is bolted and fixed in position on the cuff 78 which is integral with frame 55 and adapted to slide on the stem 72ª. The rear end of the arm 77 is formed as a toothed segment 77ª and the lever is provided with a spring pawl adapted to engage the same. It will now be understood that if the lever 76 is adjusted at its free end up or down, the plow frame 55 will be raised or lowered correspondingly. In Fig. 2 the lever is shown by dotted lines as depressed to a certain position and in consequence the frame 55 is shown in raised position. It will be understood that this adjustment of the lever 76 is for the purpose of leveling the plows and not for raising or lowering them.

The fork 64 above referred to, and shown on the left hand side of the machine, is used in place of the land wheel employed in other machines. When the plows are raised from the ground, the fork 64 slides forward on the rollers 65 and 67. The rear hangers will also swing forward or backward when this is done, thus giving a free motion throughout. If a team were pulling the plows on their wheels, the slack of the tugs or traces would let the beam slip back when the plows are raised. but since in this machine the plows are pulled by stiff connection from the beam, the beam and plows would slip back so the frame necessarily slips forward. The reason of this is, that the plow bails 53 and 53ª, when the plows are in the ground, are nearly horizontal, while, when the plows are raised from the ground, the bails are in a nearly vertical position, thus the raising of the plows would have a tendency to pull the beam backward or push the frame 55 forward, which latter is the case in my machine. Thus, the frame 55 slides forward when the plows are raised, the control being the same as if the plows were on their own wheels and pulled by a team.

Any make of gang or riding plow may be used since all that is required is to take off the wheels of the same and hang the frame and plows to my frame by means of attachments, already described. A form of plow such as I have here reference to, is illustrated in the patent of E. M. Heylman, No. 817,114, dated April 3, 1906. This plow is pulled by a team instead of being propelled by a motor such as I employ. There is no difference in my machine from what it would be if it were mounted on wheels and pulled by a team. In my case, the wheels are removed from the axles, and the axles are supported in hangers instead of by wheels. The hangers are made adjustable so that they may be let out or taken up to accommodate riding plows of any make or width.

In further explanation of the operation of my machine, I will state that in machines of the Heylman type, a land wheel is journaled on a short arm of a lever. To raise the land wheel side of the plow, said lever is adjusted so that the short arm assumes a more or less vertical position. In other words, the land wheel is pushed forward or nearer to the front end of the plow. For lowering the land wheel side, the action is reversed, the lever being adjusted so as to bring the land wheel nearer to the back end of the plow. Since the center of the land wheel is always at the same height, the land wheel side of the plow rises and falls with the adjustment of the lever and the wheel. In my machine, the fork 64 takes the place of such land wheel and has the same movements; that is to say, it slides forward when the frame is raised on that side and backward when the frame is lowered, always maintaining the same height from the ground and allowing the same freedom of movement as the wheel for which it is substituted.

The stirrup 70 takes the place of the front push wheel and the plow frame is raised and lowered by adjustment of the vertical stem of the axle 72ª in the sleeve 73 of frame 55 which is effected by means of the lever 76. The same freedom of movement is thereby allowed as if a wheel were employed, since axle 72ª rests in the stirrup 70 and always maintains the same height from the ground, the right-hand side of the plow frame 55 rising and falling with the adjustment of the lever 76.

It will be understood that when an obstruction is met by the plow, the plows and frame 55 will rise until the obstruction is passed when they resume their proper position. This is effected by means of the axle 72 of the ordinary front furrow wheel rising in the stirrup or hanger 70, on the right hand side of the machine, while on the left hand side they rise with the roller 65 as a fulcrum point.

In Fig. 1 the numeral 7 indicates a rod which is attached at its forward end to the frame of the tractor and at its rear end to the plow beams, whereby the pull is exerted for drawing the plow bodies through the ground.

I claim:

1. The combination with the wheel-supported main frame having a rearward extension, and a pendent hanger comprising rods extending inward and downward from the corners of said frame, a vertical stem supported at the apex of said hanger, a plow-carrying frame mounted upon such stem and adapted for vertical adjustment, and means connected with the front end of the plow frame for adjusting it higher or lower, substantially as described.

2. The combination with the wheel supported frame, a plow frame arranged within and below the same, bails pivoted on such frame and plows pivotally connected with the bails, a swinging hanger arranged on one side of the main frame, a device supported in the hanger and having a vertical arm or stem, the plow frame having at its adjacent corner a cuff adapted to slide on such arm, a lever and means for locking it in any vertical adjustment, the same being operatively connected with the plow frame whereby it may be raised and lowered and locked in any vertical adjustment, substantially as described.

3. The combination with a plow frame, a swinging hook hanger mounted thereon, a device supported in the hook of said hanger and having a vertical arm, the plow frame having a cuff adapted to slide on the arm, a toothed segment fixed on the cuff, a lever pivotally connected with the segment and a link connecting it with the upper end of the arm, and a pawl for locking it with the segment in any required adjustment, substantially as described.

4. The combination with the main frame, and the plow frame arranged within and below the same, of adjusting means arranged on one side of the two frames and comprising hangers pendent from the main frame, a slidable fork supported on the rear hanger and the fork proper engaging the front hanger whereby the fork is held horizontal while adapted to slide lengthwise, a bent bail journaled in the plow frame, and plow beams pivoted on the bail, a lever pivoted on the bail and having a rigid arm connected with the fork, means for locking the lever in any adjustment whereby the front portions of the plow beams may be adjusted, in the manner described.

EDMOND B. SELLARD.

Witnesses:
MATTHIAS CRUM,
CHARLES B. LYMAN.